United States Patent [19]

Kamata et al.

[11] Patent Number: 5,703,420
[45] Date of Patent: Dec. 30, 1997

[54] MOVING MAGNET TYPE MULTI-PHASE LINEAR MOTOR WITH VIBRATION SUPPRESSION AND COIL COOLING MEANS

[75] Inventors: Shigeto Kamata; Toshikazu Sakai, both of Yokohama, Japan

[73] Assignee: Canon Kabushiki Kaisha, Tokyo, Japan

[21] Appl. No.: 540,131

[22] Filed: Oct. 6, 1995

[30] Foreign Application Priority Data

Oct. 11, 1994 [JP] Japan .................. 6-245275

[51] Int. Cl.⁶ .................. H02K 9/00; H02K 41/02
[52] U.S. Cl. .................. 310/54; 310/52; 310/12; 310/91
[58] Field of Search .................. 310/12, 13, 16, 310/52, 54, 58, 64; 104/285, 290

[56] References Cited

U.S. PATENT DOCUMENTS

| | | | |
|---|---|---|---|
| 3,628,072 | 12/1971 | Nicholson | 310/13 |
| 3,913,045 | 10/1975 | Von Starck | 310/13 |
| 4,906,878 | 3/1990 | Twaalfhoven et al. | 310/12 |
| 5,255,725 | 10/1993 | Shiraki et al. | 310/12 |
| 5,352,946 | 10/1994 | Hoffman et al. | 310/12 |
| 5,359,245 | 10/1994 | Takei | 310/12 |
| 5,450,050 | 9/1995 | Ban et al. | 310/12 |

FOREIGN PATENT DOCUMENTS 1-270763  10/1989  Japan .................. 310/12

*Primary Examiner*—Thomas M. Dougherty
*Assistant Examiner*—B. Mullins
*Attorney, Agent, or Firm*—Fitzpatrick, Cella, Harper & Scinto

[57] ABSTRACT

A moving magnet type multi-phase linear motor which can suppress vibration of its own and can attain efficient cooling includes support members supporting two end portions of coils and arranged along the coil arrangement direction, pipes for supplying a coolant which are arranged in the support members, a stationary element fixed using a fixing member arranged at substantially the central portions of the coils to extend along the coil arrangement direction, and a movable element which has a substantially C-shaped section in a direction perpendicular to the coil arrangement direction.

10 Claims, 7 Drawing Sheets

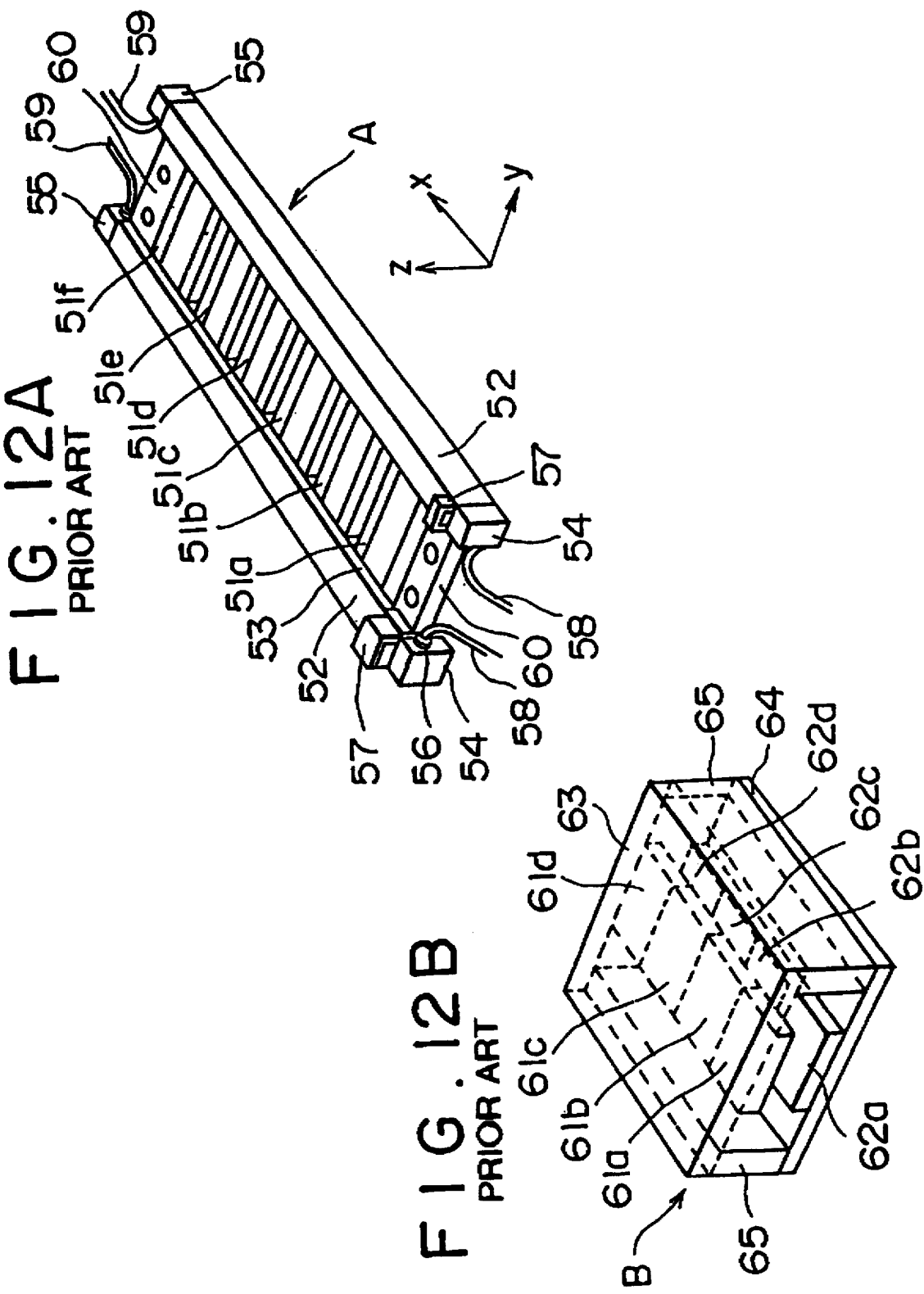

5,703,420

MOVING MAGNET TYPE MULTI-PHASE LINEAR MOTOR WITH VIBRATION SUPPRESSION AND COIL COOLING MEANS

BACKGROUND OF THE INVENTION

1. Field of the Invention

The present invention relates to a moving magnet type multi-phase linear motor and, more particularly, to a moving magnet type multi-phase linear motor which is used as a drive source for precision equipment, such as a semiconductor manufacturing apparatus, a precision measurement apparatus, a precision working machine, and the like.

2. Related Background Art

FIGS. 12A and 12B show a conventional moving magnet type multi-phase linear motor. FIG. 12A shows a stationary element (or stator) having a plurality of coils, and FIG. 12B shows a movable element having a plurality of magnets. In FIGS. 12A and 12B, coils 51a to 51f of a stationary element A are each wound in a substantially rectangular shape, and are aligned and held by two support members 52 extending in the x-axis direction.

The support members 52 consist of a non-magnetic member, e.g., an aluminum-based material, and have holes for receiving the side portions of the coils 51a to 51f. After the coils 51a to 51f are inserted in the support members 52, they are fixed thereto using an adhesive. A cooling pipe for supplying a coolant for cooling the coils 51a to 51f extends through each support member 52 in the x-axis direction. The lead wires of the coils 51a to 51f extend along the support members 52, and are connected to wire connectors 57. Piping connectors 54 and 55 are fixed to the respective end portions of the support members 52 to connect the cooling pipes of the support members 52 to pipes 58 and 59 for guiding a coolant. The pipes 58 and 59 are respectively connected to the connectors 54 and 55 via nipples 56.

Attachments 60 used for attaching the stationary element A to a stationary body (not shown) are fixed to the two ends of the support members 52 to hold the support members 52 in the state illustrated in FIG. 12A. Therefore, the stationary element A constituted by the coils 51a to 51f, the support members 52, and the like is fixed at the two portions in its longitudinal direction (x-axis direction), i.e., at the two positions of the attachments 60. The movable element has a box shape formed by coupling an upper yoke 63 having magnets 61a to 61d and a lower yoke 64 having magnets 62a to 62d via two side plates 65. The magnets 61a to 61d and 62a to 62d are arranged, so that opposing magnets have different polarities. Also, adjacent magnets in the x-axis direction have different polarities. The yokes 63 and 64 consist of an iron-based material (a magnetic material).

SUMMARY OF THE INVENTION

However, such a conventional linear motor suffers the following drawbacks in terms of vibrations and heat when a long-stroke or high-output linear motor is to be realized.

(1) The moving stroke can be prolonged by aligning many coils in the x-axis direction. However, since the linear motor coils are fixed at only the two ends in their longitudinal direction, an increase in length in the x-axis direction leads to a decrease in rigidity of the linear motor when the dimensions in the y-axis and z-axis directions remain the same. As a result, a string vibration in the z- or y-axis direction increases, and the vibration frequency is lowered. For this reason, when such a motor is assembled in an apparatus, the vibration of the motor itself is transmitted to the apparatus side, and vibrates the apparatus itself. As a result, precision alignment using a linear motor and the like is disturbed, and it is disadvantageous in terms of space and weight to increase the thickness.

(2) When an excessive current is supplied to increase the driving force of a linear motor, the amount of heat generated by each coil increases in proportion to the square of the current. If the surface area of a cooling pipe or the flow rate of a coolant is small, heat generated by each coil cannot be sufficiently recovered. Therefore, the performance of the magnets deteriorates due to a temperature rise, and precision alignment or the like is disturbed due to a thermal deformation, air fluctuation, or the like of an apparatus which mounts the linear motor.

The present invention has been made in consideration of the above situation, and has as its object to provide a moving magnet type multi-phase linear motor which can suppress vibrations of its own, and can attain efficient cooling.

It is another object of the present invention to provide a moving magnet type multi-phase linear motor, which can realize a long-stroke motor.

In order to achieve the above objects, according to the present invention, in a moving magnet type multi-phase linear motor for moving the movable element with respect to the stationary element by giving a thrust to a magnet of the movable element by supplying a current to a plurality of coils of the stationary element, the coils are supported at their two end portions by support members extending along a coil arrangement direction, pipes for supplying a coolant are arranged in the support members to extend along the coil arrangement direction, the stationary element is fixed using a fixing member arranged at substantially the central positions of the coils to extend along the coil arrangement direction, and the movable element has a substantially C-shaped section in a direction perpendicular to the coil arrangement direction.

Note that the fixing member may fix the coils of the stationary element. Also, a cooling pipe for supplying a coolant may be arranged in the fixing member, or recess portions or grooves may be formed in the fixing member, and the coils may be arranged in the recess portions or the grooves.

According to another aspect of the present invention, in a moving magnet type multi-phase linear motor for moving a movable element with respect to a stationary element by giving a thrust to a magnet of the movable element by supplying a current to a plurality of coils of the stationary element, the coils are supported at their two end portions by support members extending along a coil arrangement direction, pipes for supplying a coolant are arranged in the support members to extend along the coil arrangement direction, the stationary element is fixed using a fixing member arranged along the coil arrangement direction, and the movable element has a substantially U-shaped section in a direction perpendicular to the coil arrangement direction.

In this invention, the fixing member may fix the coils of the stationary element. Also, a cooling pipe for supplying a coolant may be arranged in the fixing member, or contact portions between the fixing member and the stationary element may be fastened by a bolt.

According to another aspect of the present invention, in a moving magnet type multi-phase linear motor for moving a movable element with respect to a stationary element by giving a thrust to a magnet of the movable element by supplying a current to a plurality of coils of the stationary element, the coils are supported at their two end portions by support members extending along a coil arrangement direction, pipes for supplying a coolant are arranged in the support members to extend along the coil arrangement direction, first and second fixing members for fixing the stationary element are arranged, the first fixing member is arranged at substantially the central portions of the coils to extend in the coil arrangement direction, the second fixing members are arranged at two end portions, in the coil arrangement direction, of the stationary element, and the movable element has a substantially C-shaped section in a direction perpendicular to the coil arrangement direction.

In this invention, the first fixing member may fix the respective coils, a cooling pipe for supplying a coolant may be arranged in the first fixing member, or recess portions or grooves may be formed in the first fixing member, so that the coils may be arranged in the recess portions or grooves. Also, the stationary element may be fixed to a predetermined stationary body by only the second fixing members of the first and second fixing members.

According to another aspect of the present invention, since substantially the central portions of coils of a stationary element supported by support pipes having cooling pipes are fixed and supported using a fixing member, the vibration of a linear motor can be reduced even in a linear motor which is elongated in its longitudinal direction in which a thrust is generated. When the cooling pipe is arranged in the fixing member, heat generated by the coils can be efficiently recovered.

According to another aspect of the invention, since one of the support members having the cooling pipes is held by the fixing member, the diameter of the cooling pipe can be increased, and heat generated by the coils can be efficiently recovered while suppressing vibrations of the stationary element including the coils.

BRIEF DESCRIPTION OF THE DRAWINGS

FIGS. 12A and 12B are perspective views showing a conventional moving magnet type multi-phase linear motor.

DETAILED DESCRIPTION OF THE PREFERRED EMBODIMENTS

Figure 1A:
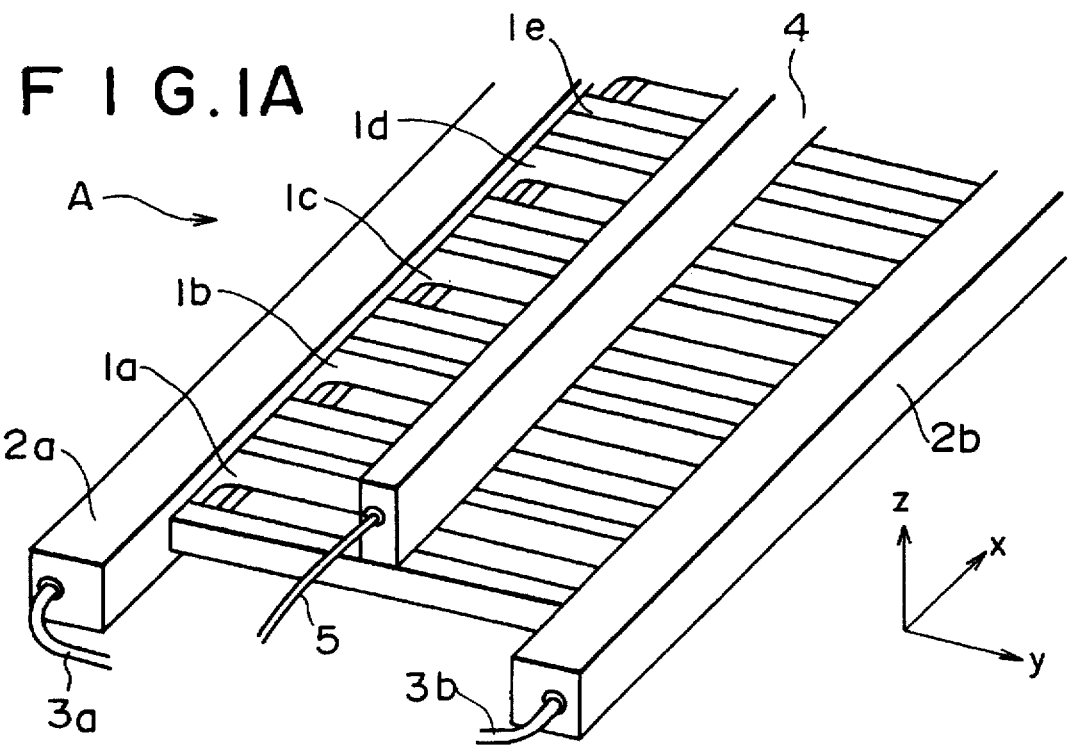
FIGS. 1A and 1B are perspective views showing an embodiment of a moving magnet type multi-phase linear motor according to the present invention.
Figure 1B:
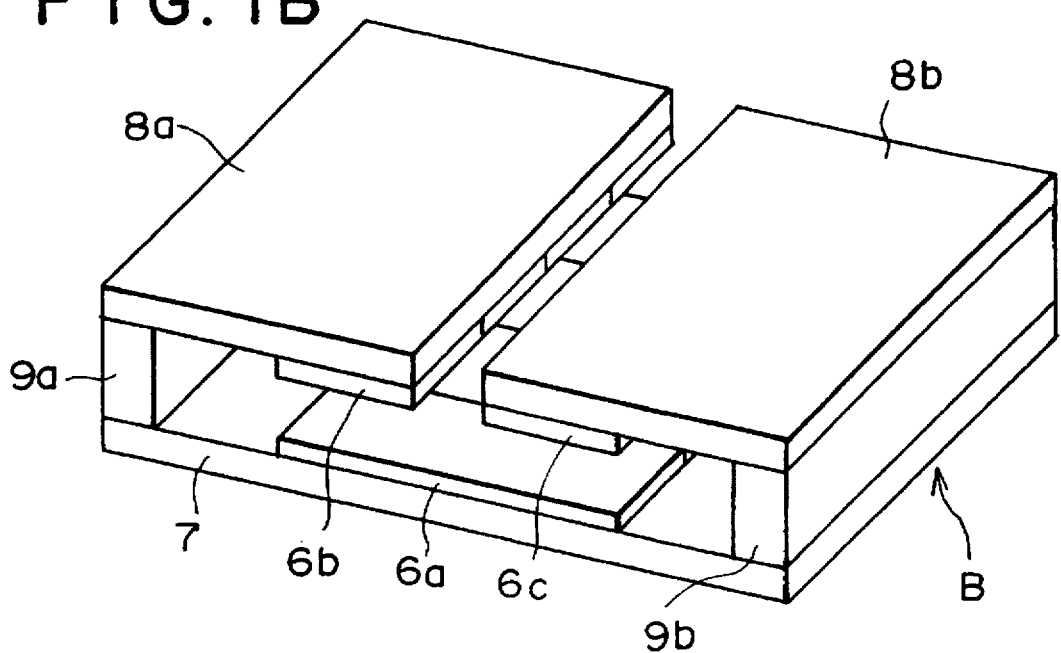

FIGS. 1A and 1B are perspective views best illustrating the feature of a moving magnet type multi-phase linear motor according to the present invention. FIG. 1A shows a partial portion of a stationary element A of a linear motor, and FIG. 1B shows a movable element B of the linear motor. Coils $1a$ to $1e$ of the stationary element A are each wound in a substantially rectangular shape, and are arranged at predetermined intervals in the x-axis direction. Support members $2a$ and $2b$ support the coils $1a$ to $1e$ by sandwiching them from their two end portions in the y-axis direction between themselves. Cooling pipes $3a$ and $3b$ circulate a coolant in the support members $2a$ and $2b$. The cooling pipes $3a$ and $3b$, respectively have a longitudinal hole and a tube connected to the hole. A fixing member 4 supports the coils $1a$ to $1e$ at a position between the support members $2a$ and $2b$, and is fixed to the stationary surface of a stationary body (not shown). The fixing member 4 is arranged at substantially-the central portions of the coils $1a$ to $1e$ to extend in the x-axis direction, and integrally holds the coils $1a$ to $1e$.

A cooling pipe 5 circulates a coolant in the fixing member 4. The cooling pipe 5 has a longitudinal hole and a tube connected to the hole. A permanent magnet $6a$ is held by the movable element B. Permanent magnets $6b$ and $6c$ of the movable element B are arranged to oppose the magnet $6a$. A lower yoke 7 fixes the magnet $6a$. Divided yokes $8a$ and $8b$ respectively fix the magnets, and are arranged to be separated by a predetermined distance in the y-axis direction. Yoke spacers $9a$ and $9b$ are respectively fixed between the yoke 7 and the divided yoke $8a$, and between the yoke 7 and the divided yoke $8b$ in the z-axis direction. Note that the stationary element A is partially illustrated, and the movable element B is coupled to a movable body (not shown).

Figure 2:
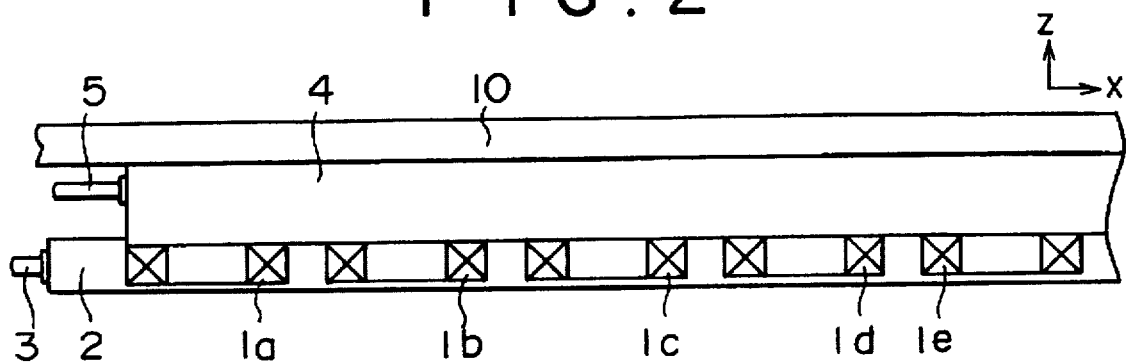
FIG. 2 is a sectional view showing the X-Z section of the embodiment shown in FIGS. 1A and 1B.
Figure 6:
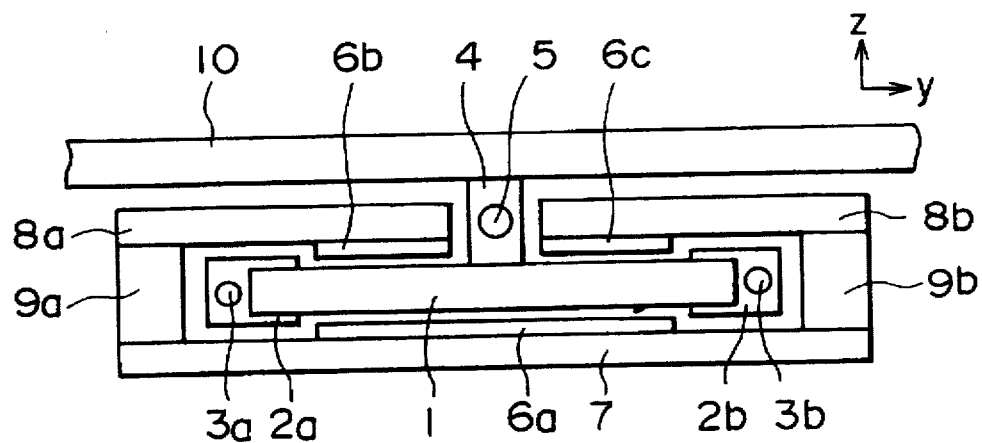
FIG. 6 is a sectional view showing the Y-Z section of the embodiment shown in FIGS. 1A and 1B.

FIG. 2 is a partial sectional view of a portion near the fixing member 4 on the stationary element A side taken along the X-Z plane. In FIG. 2, the fixing member 4 is fixed to a stationary body 10. The coils $1a$ to $1e$ are supported by the support members 2 having the cooling pipes 3, and are adhered to the fixing member 4 which has the cooling pipe 5 and is fixed to the stationary body 10. FIG. 6 is a Y-Z sectional view showing a state wherein the movable element B is assembled in the stationary element A shown in FIG. 1. As can be seen from FIG. 6, the movable element B has a substantially C shape whose notch portion points in the +z-axis direction in a Y-Z sectional view (the upward direction in FIG. 6). The fixing member 4 is fixed to the stationary body 10 by a bolt, an adhesive, or the like. The movable element B moves relative to the stationary element A in only the x-axis direction since their movements in directions other than the x-axis (translation) direction are restricted by a guide (not shown).

Referring to FIGS. 1A and 1B, a magnetic field is present between the magnet $6a$ and the magnets $6b$ and $6c$, which oppose each other. When an appropriate current is supplied to the coils $1a$ to $1e$ present in this magnetic field, a Lorentz force is generated, and the magnets $6a$ to $6c$ and the coils $1a$ to $1e$, i.e., the movable element B and the stationary element A move relative to each other in the x-axis direction. In this case, since the stationary element A is fixed, the movable element B is driven in the x-axis direction. The stationary element A is fixed to the stationary body (not shown in FIGS. 1A and 1B) via at least the upper surface (+Z side) of the fixing member 4.

Since the coils 1a to 1e are respectively fixed via the fixing member 4, even when the movable element A (the coils 1a to 1e) is elongated in the x-axis direction, a string vibration of the coils 1a to 1e including the support members 2a and 2b can be mainly suppressed, and the positioning performance of the moving magnet type multi-phase linear motor can be improved. With this arrangement, for example, it is confirmed, based on analysis and experiments, that when the dimension, in the x-axis direction, of the stationary element A is 1 m or more, the rigidity of the motor becomes 10 times or more than that of a conventional motor. This fact can provide an effect of minimizing any adverse influence in terms of vibration on an apparatus which mounts the linear motor.

On the other hand, a current flows through the coils 1a to 1e via wiring lines (not shown) of the coils so as to drive the movable element B, as described above. With this current, the coils 1a to 1e generate heat. The heat causes a thermal deformation of the structural body, fluctuation of the atmosphere, deterioration of the permanent magnets, and the like. In order to recover this heat, a coolant is supplied to the cooling pipes 3a and 3b of the support members 2a and 2b. Also, the cooling pipe 5 is arranged in the fixing member 4 located between the support members 2a and 2b, and a coolant is supplied to this pipe, thus attaining cooling at the central portions of the coils 1a to 1e in addition to the two end portions, in the y-axis direction, of the coils. Thus, the cooling efficiency of the coils 1a to 1e can be improved, and heat transmitted to air or an external structural body can be reduced.

The cooling pipe 5 arranged in the fixing member 4 also suppresses transmission of heat generated by the coils 1a to 1e to the stationary body 10 (see FIG. 6) via the fixing member 4. In this manner, since the support members 2a and 2b and the fixing member 4 respectively include cooling means, heat recovery can be efficiently attained. This fact provides the effect of minimizing any adverse influence in terms of heat on an apparatus which mounts the linear motor.

As described above, since the end portions of the coils 1a to 1e are supported by the support members 2a and 2b having the cooling pipes 3a and 3b, and the central portions of the coils 1a to 1e are supported and fixed by the fixing member 4 having the cooling pipe 5, the rigidity of the stationary element A including the coils 1a to 1e and the support members 2a and 2b can be increased and the cooling efficiency of the coils 1a to 1e can be improved without increasing the size or weight of the support members 2a and 2b. Therefore, factors such as a vibration, heat, and the like, that impair precision, can be eliminated to cope with an increase in length of the stationary element A and an increase in the amount of heat generated by the coils.

Since the stationary element A is fixed to the stationary body 10 via the fixing member 4, the permanent magnet on the upper portion of the movable element B is divided into the magnets 6b and 6c, and its upper yoke is divided into divided yokes 8a and 8b. The gap, in the y-axis direction, between the magnets 6b and 6c serves as a space for avoiding an interference with the fixing member 4. A set of the yoke 7, the divided yoke 8a, and the yoke spacer 9a, and a set of the yoke 7, the divided yoke 8b, and the yoke spacer 9b are fixed by, e.g., bolts (not shown) so as to maintain substantially the C shapes shown in FIG. 6 against the attraction forces acting between the magnets 6a and 6b and between the magnets 6a and 6c. In this manner, since the yoke is divided at the central portion of the movable element B, interference between the stationary element A and the fixing member 4 can be avoided.

Figure 3:
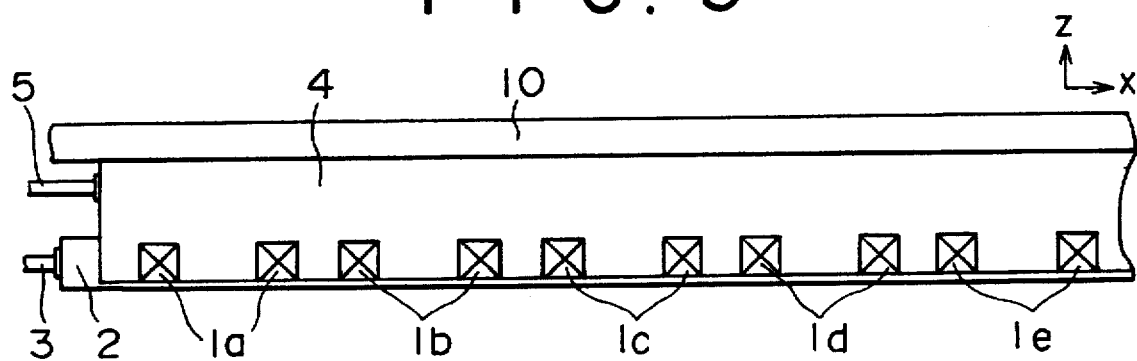
FIG. 3 is a sectional view showing another example of a stationary element of the embodiment shown in FIGS. 1A and 1B.

FIG. 3 is a partial X-Z sectional view of another embodiment of the movable element B according to the present invention. Recess portions are formed in joint portions of the fixing member 4 to the coils 1a to 1e, and the coils 1a to 1e are fitted in and adhered to these portions. In this embodiment, the total area of the joint portions between the coils 1a to 1e and the fixing member 4 increases, and heat generated by the coils 1a to 1e can be more efficiently transmitted to the fixing member 4, thus increasing the amount of heat recovered by the coolant in the cooling pipe 5. With this embodiment, the effect of improving the cooling efficiency is expected. When the recess portions are precisely formed in the fixing member 4, the coils 1a to 1e can be aligned in the x-axis direction without using another alignment jig, and the assembling process can be simplified. Other effects are the same as in the above embodiment.

Figure 4:
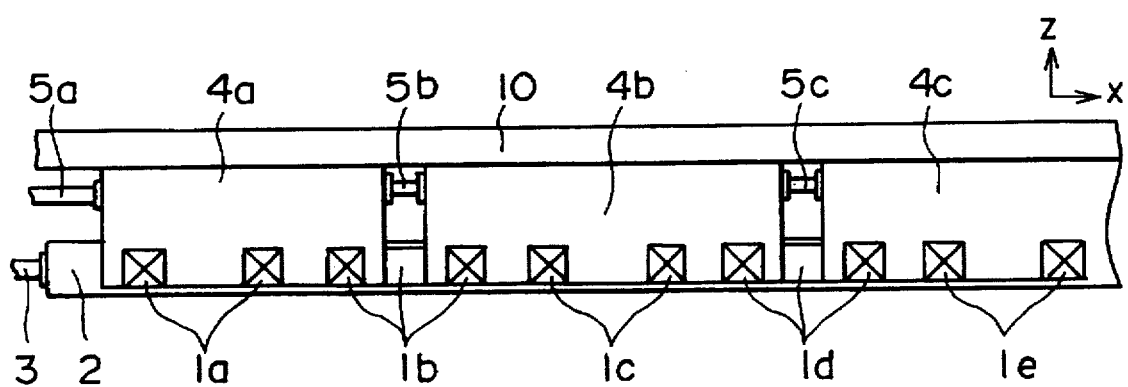
FIG. 4 is a sectional view showing still another example of the stationary element of the embodiment shown in FIGS. 1A and 1B.

FIG. 4 is a partial X-Z sectional view of still another embodiment of the movable element according to the present invention. Fixing members 4a, 4b, and 4c respectively fix the coils 1a to 1e to the stationary body 10, and cooling pipes 5a, 5b, and 5c respectively supply a coolant to the fixing members 4a, 4b, and 4c. FIG. 4 exemplifies a case wherein the coolant is serially supplied to the fixing members 4a, 4b, and 4b. Alternatively, parallel cooling pipes may be arranged in the fixing members 4a, 4b, and 4c to supply a coolant. The fixing members 4a, 4b, and 4c correspond to ones obtained by dividing the fixing member 4 shown in FIG. 3 into pieces. Using the divided fixing members 4a, 4b, and 4c, the dimension, in the x-axis direction, of each of the fixing members 4a to 4c can be small, and the members 4a to 4c can be easily worked to obtain high shape precision. Other effects are the same as in the above embodiment.

Figure 5:
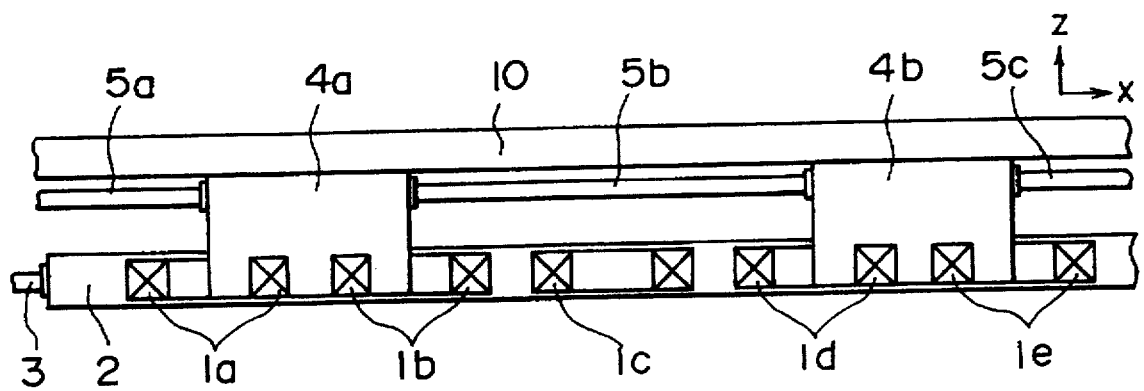
FIG. 5 is a sectional view showing still another example of the stationary element of the embodiment shown in FIGS. 1A and 1B.

FIG. 5 is a partial X-Z sectional view of still another embodiment of the movable element according to the present invention. Fixing members 4a and 4b respectively fix the coils 1a and 1b and the coils 1d and 1e to the stationary body 10. The interval between the fixing members 4a and 4b can be increased within the range in which the rigidity of the stationary element A, i.e., the rigidity of the support members 2 and the coils 1a to 1e, is not impaired. As described above, since some of the coils 1a to 1e, supported by the support members 2, are fixed to the stationary body 10 using the fixing members 4a and 4b, the number and weight of the fixing members 4a and 4b can be reduced, and the arrangement can be simplified. Other effects are the same as in the above embodiment.

Figure 7:
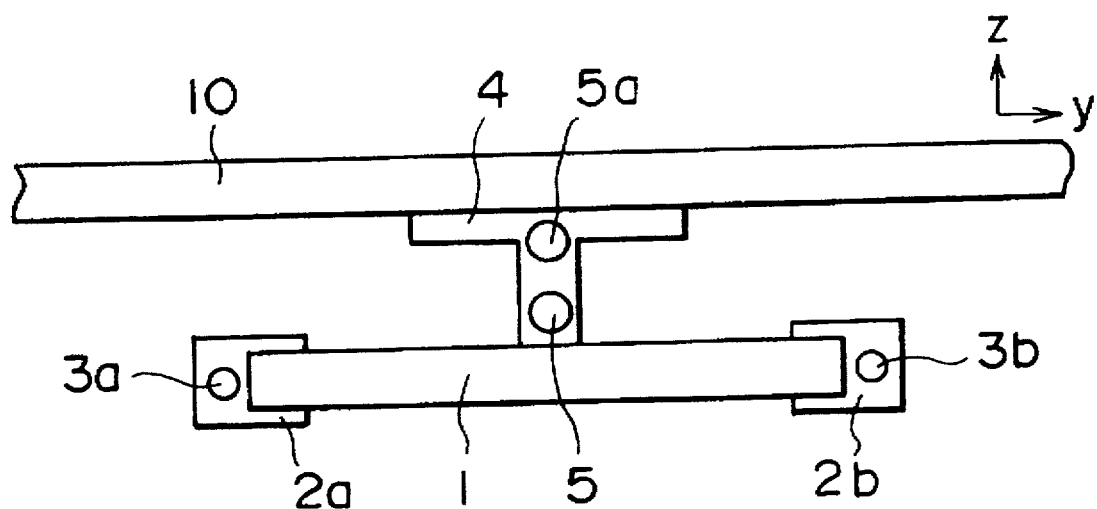
FIG. 7 is a view showing still another example of the stationary element of the embodiment shown in FIGS. 1A and 1B.

FIG. 7 is a Y-Z sectional view showing another embodiment of the stationary element A according to the present invention. The fixing member 4 has cooling pipes 5a and 5b. When the plurality of cooling pipes 5 are arranged, as described above, or when the sectional area of the cooling pipe 5 is increased, the surface area of the cooling pipe can be increased, and the flow rate of the coolant can also be increased.

When the Y-Z section of the fixing member 4 is designed to have a T shape, the fixing member 4 can be fastened to the stationary body 10 by a bolt without interfering with the cooling pipe 5a. In addition, since the contact area between the fixing member 4 and the stationary body 10 increases, the adhesion area increases, and the adhesive force increases. Therefore, when the plurality of cooling pipes 5 (5a and 5b) are arranged or the sectional area of the cooling pipe is increased, and the fixing member 4 is designed to have a T-shaped section, the cooling efficiency can be improved, and the fixing member 4 can be firmly fixed to the stationary body 10. Other effects are the same as in the above embodiment.

Figure 8:
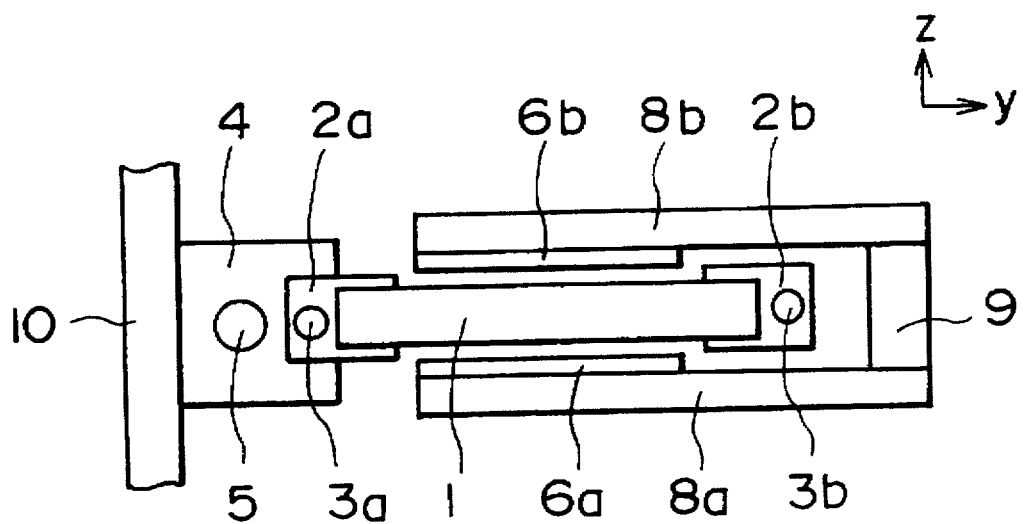
FIG. 8 is a view showing another embodiment of a moving magnet type multi-phase linear motor according to the present invention.

FIG. 8 shows another embodiment of the present invention. In FIG. 8, divided yokes 8a and 8b are fixed to a yoke spacer 9. Additionally, the divided yokes 8a, 8b and the yoke spacer 9 may be integrally formed with a single member. Opposing permanent magnets 6a and 6b are respectively fixed to the divided yokes 8a and 8b. The permanent magnets 6a and 6b attract each other. In this case, the yoke spacer 9 supports the divided yokes 8a and 8b on which the magnets 6a and 6b are arranged so that the movable element maintains a substantially U shape against the attraction force.

A coil 1 is present in a magnetic field generated between the magnets 6a and 6b, and a Lorentz force is generated in a direction (x-axis direction) perpendicular to the plane of the drawing of FIG. 8 by supplying a current to the coil 1. With this force, the coil 1 and the magnets 6a and 6b relative move to each other in the x-axis direction. When a current flows through the coil 1, the coil 1 generates heat, and this heat raises the atmospheric temperature to cause fluctuations in the air or to thermally deform or cause deterioration of the structural body and the permanent magnets. In order to prevent this, cooling pipes 3a and 3b are arranged in support members 2a and 2b for supporting the coil 1, and the coil 1 is cooled by a coolant.

Furthermore, in order to increase the rigidity of the coils, reduce vibrations, and improve the cooling performance of the coil, a fixing member 4 having a cooling pipe 5 is arranged on the support member 2a, and the support member 2a is fixed to a stationary body 10 via the fixing member 4. Since the coil 1 is fixed to the stationary body 10, the magnets 6a and 6b are driven in the x-axis direction by the above-mentioned Lorentz force. Since the fixing member 4 is arranged on the support member 2a, the yoke spacer 9 is present on only the right side (+Y side) of the divided yokes 8a and 8b, but is not present on the left side (-Y side) thereof.

In this manner, when the coil 1 is supported by the support members 2a and 2b having the cooling pipes 3a and 3b, one support member is supported and fixed by the fixing member 4 having the cooling pipe 5, thereby increasing the rigidity of the stationary element, including the coil 1 and the support members 2a and 2b, and improving the cooling performance of the coil 1. For this reason, factors such as a vibration, heat, and the like, that impair precision, can be eliminated to cope with an increase in length of the stationary element and an increase in the amount of heat generated by the coils. In addition, the number of parts of the movable element constituted by the magnets 6a and 6b, the divided yokes 8a and 8b, and the like can be reduced, and the structure can be simplified, thus allowing easy manufacturing and assembling processes, and reducing the cost of the motor.

Figure 9:
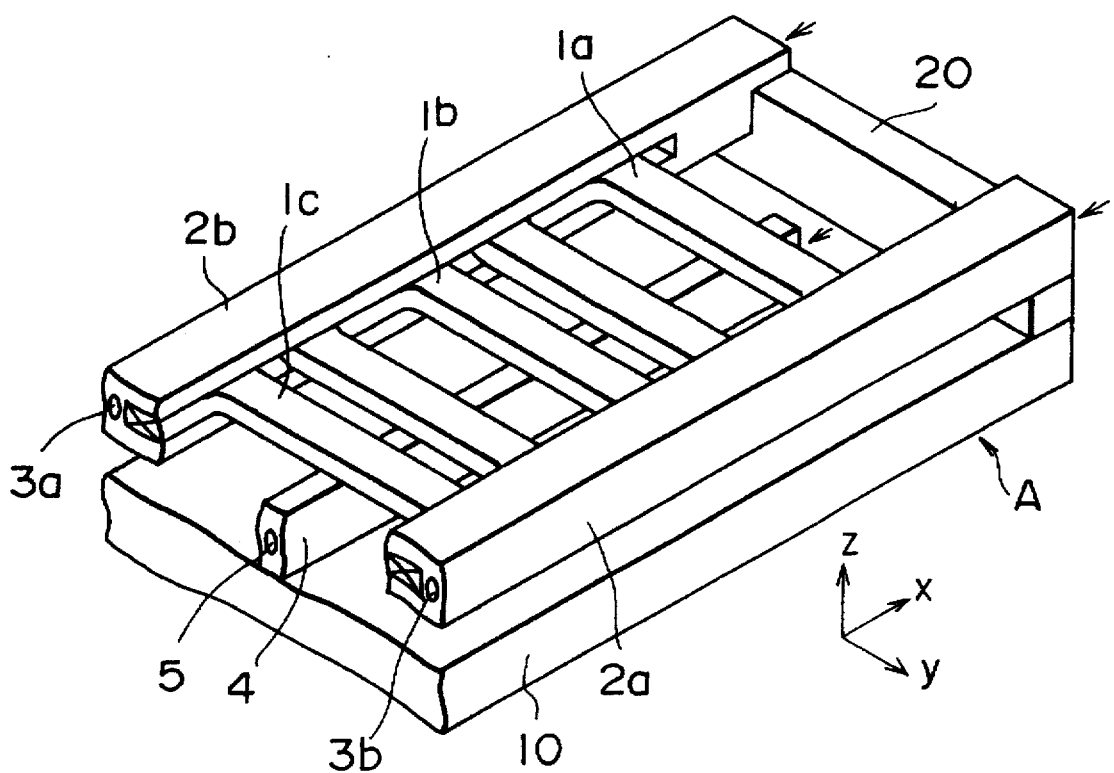
FIG. 9 is a perspective view showing still another embodiment of a moving magnet type multi-phase linear motor according to the present invention.

FIG. 9 shows still another embodiment of the present invention. The two end portions, in the x-axis direction, of the support members 2a and 2b in the above embodiment shown in FIGS. 1A and 1B are fixed to the stationary body 10 using end-portion fixing members 20. Although the up-and-down direction (z-axis direction) in FIG. 9 is reversed to that in FIGS. 1A and 1B, other aspect of FIG. 9 are the same as those in the embodiment shown in FIGS. 1A and 1B, and a repetitive, detailed description thereof will not be provided. In this embodiment, since the two end portions of the support members 2a and 2b are further fixed to the stationary body 10 by the end-portion fixing members 20, the rigidity of the stationary element A can be improved, as compared to the embodiment shown in FIGS. 1A and 1B. For this reason, the adverse influence caused by the vibration of the stationary element A on an apparatus which mounts a linear motor can be further eliminated.

In this embodiment, since the support members 2a and 2b are fixed to the stationary body 10 by the end-portion fixing members 20, the fixing member 4, fixed to the coils 1a to 1c, need not be fixed to the stationary body 10. More specifically, the shape and/or the mounting position of the fixing member 4 may be determined, so that the surface, opposite to the coil holding surface, of the fixing member 4, merely contacts the stationary body 10 or the fixing member 4 is located to have a predetermined gap in the z-axis direction between the fixing member 4 and the stationary body 10. In this case, although the rigidity of the stationary element A is lowered as compared to the above-mentioned embodiment, the rigidity is improved as compared to the conventional art shown in FIGS. 12A and 12B, since the fixing member 4 couple the coils 1a to 1c, thus reducing a string vibration in the z- or y-axis direction.

Figure 10:
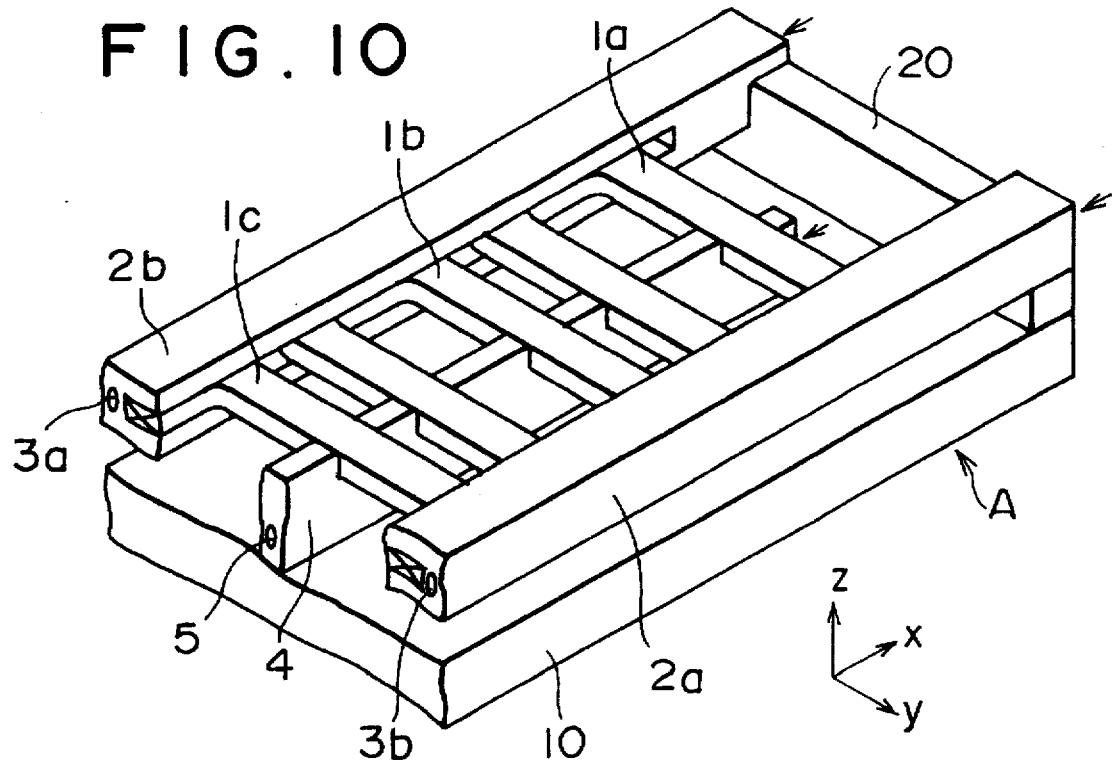
FIG. 10 is a perspective view showing still another embodiment of a moving magnet type multi-phase linear motor according to the present invention.

FIG. 10 shows a modification of the embodiment shown in FIG. 9. In the embodiment shown in FIG. 9 described above, recess portions are formed in joint portions for the coils 1a to 1c of the fixing member 4, and the coils 1a to 1c are fitted in and adhered to these recess portions. In this embodiment, the total area of the joint portions between the coils 1a to 1c and the fixing member 4 increases, and heat generated by the coils 1a to 1c can be more efficiently transmitted to the fixing member 4, thus increasing the amount of heat recovered by the coolant in the cooling pipe 5. For this reason, the cooling efficiency can be improved. When the recess portions are precisely formed on the fixing member 4, the coils 1a to 1c can be aligned in the x-axis direction without using another alignment jig, thus simplifying the assembling processes. Other arrangements and effects are the same as those in the above-mentioned embodiment shown in FIG. 9.

In the embodiment shown in FIG. 10 as well, the fixing member 4 need not adhere to the stationary body 10, but the fixing member 4 may merely contact the stationary body 10 or a predetermined gap may be formed in the z-axis direction between the fixing member 4 and the stationary body 10.

Figure 11:
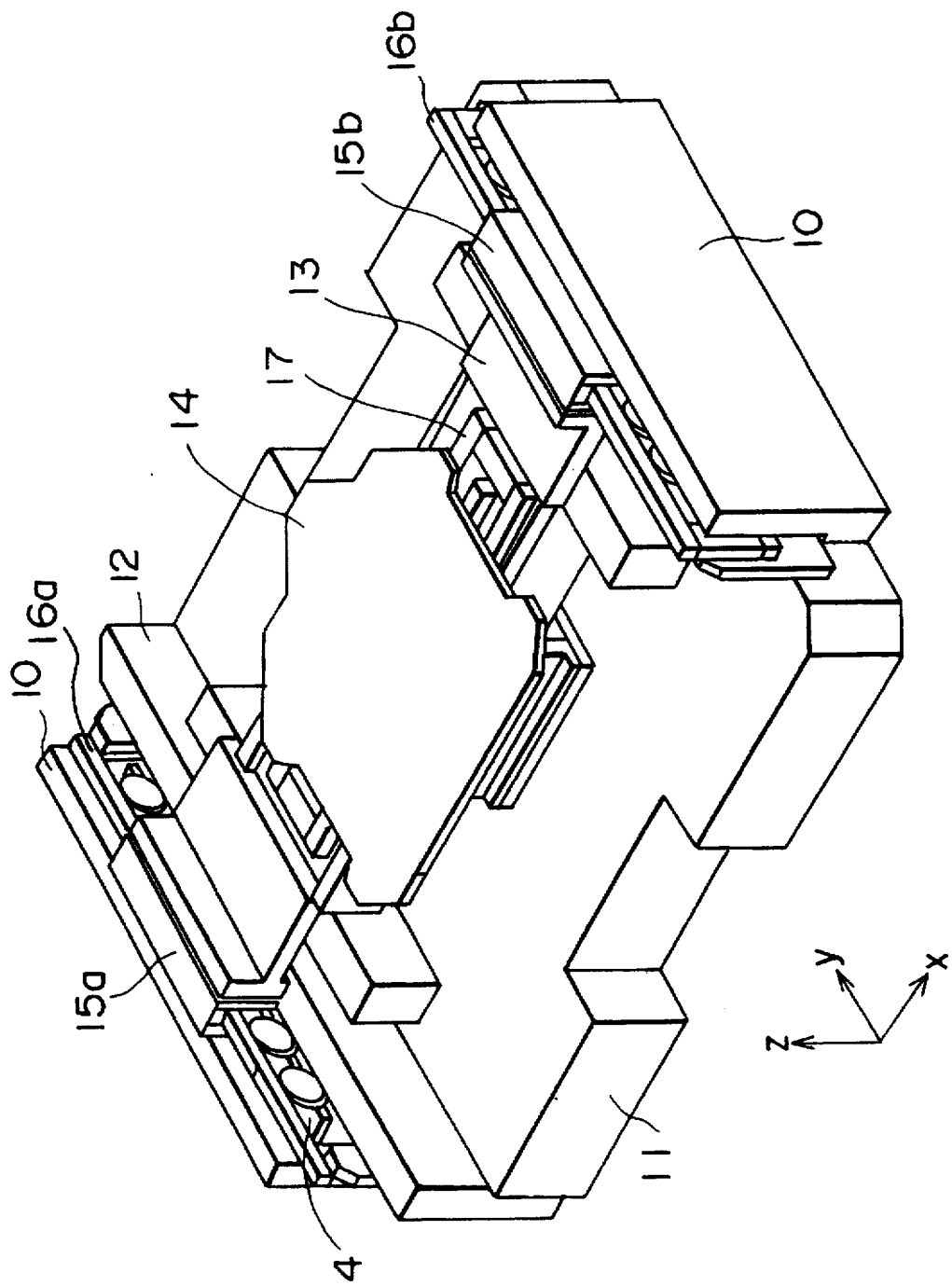
FIG. 11 is a perspective view showing an example of an X-Y stage which adopts the embodiment of the present invention.

FIG. 11 is a perspective view showing the arrangement in which the moving magnet type multi-phase linear motor of the present invention is mounted in an X-Y stage of a semiconductor manufacturing apparatus, and in particular, a step-and-repeat or step-and-scan type exposure apparatus for manufacturing semiconductor elements.

Referring to FIG. 11, a table 11 has an upper surface serving as a reference plane, and a stationary guide 12 has a side surface serving as a reference plane. A Y stage 13 moves as a movable body on the table 11 in the y-axis direction, and an X stage 14 moves as a movable body on the table 11 in the x-axis direction. In this case, the X stage 14 uses the side surface of the Y stage 13 as a guide reference surface, and moves together with the Y stage 13 in the y-axis direction. A moving magnet type multi-phase linear motor for driving the Y stage according to the present invention has stationary elements 16a and 16b, and movable elements 15a and 15b. A moving magnet type multi-phase linear motor 17 according to the present invention drives the X stage. The Y-stage linear motor is fixed to a stationary body 10 via a fixing member 4.

This X-Y stage has alignment precision on the nanometer order using a laser interference type position measuring device, a controller, and a linear motor driver (not shown). A fine vibration of the stage itself, and thermal deformation or air fluctuation caused by a temperature change as small as about 0.1° C. causes deterioration of the performance of the stage. For this reason, in the stage shown in FIG. 11, the linear motors 16a and 16b of the linear motor are fixed using the fixing member 4 (see FIGS. 1A and 1B) having the cooling pipe 5 (see FIGS. 1A and 1B), thus improving the rigidity and cooling performance of the linear motor without increasing the size and weight of the linear motor.

For example, even when the movable range of the Y stage is widened, and the lengths of the linear motors 16a and 16b of the Y-stage linear motor increase in the y-axis direction, or even when the amount of current to be supplied increases and the amount of heat increases to increase the driving force, since the linear motor is supported by the fixing member 4 having the cooling pipe 5, a vibration and temperature rise of the linear motor and its surrounding portion can be minimized.

As a result, since factors that cause a deterioration in the alignment performance of the X-Y stage, i.e., a fine vibration, thermal deformation, air fluctuation, and the like can be suppressed, alignment precision, alignment time, and the like, of the X-Y stage can be improved. Furthermore, adverse influences, such as vibrations and heat, on a semiconductor manufacturing apparatus, a measurement device, a working machine, and the like on which the X-Y stage is mounted, can be eliminated.

As described above, according to the present invention, even when a moving magnet type multi-phase linear motor adopts a long-stroke or high-output arrangement, a vibration of a stationary element can be suppressed without largely changing the weight and size of the linear motor, and the cooling efficiency of a coolant can be improved, thus efficiently recovering generated heat.

What is claimed is:

1. A moving magnet type multi-phase linear motor for moving a movable element relative to a stationary element by giving a thrust to a magnet of the movable element side by supplying a current to a plurality of coils of the stationary element side, comprising:

support members for supporting the plurality of coils by holding two end portions of the coils, said support members extending along a coil arrangement direction;

pipes for supplying a coolant inside said support members, said pipes extending along the coil arrangement direction;

a fixing member for fixing the stationary element, said fixing member being arranged at substantially central portions of the coils to extend along the coil arrangement direction, wherein the movable element has a substantially C-shaped section when viewed along a direction perpendicular to the coil arrangement direction; and a cooling pipe for supplying a coolant arranged in said fixing member.

2. A linear motor according to claim 1, wherein said fixing member fixes each of the coils of the stationary element side.

3. A moving magnet type multi-phase linear motor for moving a movable element relative to a stationary element by giving a thrust to a magnet of the movable element side by supplying a current to a plurality of coils of the stationary element side, comprising:

support members for supporting the plurality of coils by holding two end portions of the coils, said support members extending along a coil arrangement direction;

pipes for supplying a coolant inside said support members, said pipes extending along the coil arrangement direction; and a fixing member for fixing the stationary element, said fixing member being arranged at substantially central portions of the coils to extend along the coil arrangement direction, wherein the movable element has a substantially C-shaped section when viewed along a direction perpendicular to the coil arrangement direction, wherein recess portions or grooves are formed in said fixing member, and the plurality of coils are arranged in the recess portions or grooves.

4. A moving magnet type multi-phase linear motor for moving a movable element relative to a stationary element by giving a thrust to a magnet of the movable element side by supplying a current to a plurality of coils of the stationary element side, comprising:

support members for supporting the plurality of coils by holding two end portions of the coils, said support members extending along a coil arrangement direction;

pipes for supplying a coolant to inside said support members, said pipes extending along the coil arrangement direction;

a fixing member for fixing the stationary element, said fixing member being arranged on said support members to extend along the coil arrangement direction, wherein the movable element has a substantially U-shaped section when viewed along a direction perpendicular to the coil arrangement direction; and a cooling pipe for supplying a coolant to said fixing member arranged in said fixing member.

5. A linear motor according to claim 4, wherein said fixing member fixes one side portion of said support members.

6. A linear motor according to claim 4, wherein said fixing member contacts said stationary element at contact portions thereof, wherein said contact portions between said fixing member and the stationary element are fastened by a bolt.

7. A moving magnet type multi-phase linear motor for moving a movable element relative to a stationary element by giving a thrust to a magnet of the movable element side by supplying a current to a plurality of coils of the stationary element side, comprising:

support members for supporting the plurality of coils by holding two end portions of the coils, said support members extending along a coil arrangement direction;

pipes for supplying a coolant to inside said support members, said pipes extending along the coil arrangement direction;

first and second fixing members for fixing the stationary element, said first fixing member being arranged at substantially central portions of the coils to extend along the coil arrangement direction, and said second fixing members being arranged at two end portions, in the coil arrangement direction, of the stationary element, wherein the movable element has a substantially C-shaped section when viewed along a direction perpendicular to the coil arrangement direction; and a cooling pipe for supplying a coolant to said first fixing member.

8. A linear motor according to claim 7, wherein said first fixing member fixes each of thee coils.

9. A moving magnet type multi-phase linear motor for moving a movable element relative to a stationary element by giving a thrust to a magnet of the movable element side by supplying a current to a plurality of coils of the stationary element side, comprising:

support members for supporting the plurality of coils by holding two end portions of the coils, said support members extending along a coil arrangement direction;

pipes for supplying a coolant to inside said support members, said pipes extending along the coil arrangement direction; and first and second fixing members for fixing the stationary element, said first fixing member being arranged at substantially central portions of the coils to extend along the coil arrangement direction, and said second fixing members being arranged at two end portions, in the coil arrangement direction, of said stationary element, wherein the movable element has a substantially C-shaped section when viewed along a direction perpendicular to the coil arrangement direction, wherein recess portions or grooves are formed in said first fixing member, and the plurality of coils are arranged in the recess portions or grooves.

10. A moving magnet type multi-phase linear motor for moving a movable element relative to a stationary element by giving a thrust to a magnet of the movable element side by supplying a current to a plurality of coils of the stationary element side, comprising:

support members for supporting the plurality of coils by holding two end portions of the coils, said support members extending along a coil arrangement direction;

pipes for supplying a coolant to inside said support members, said pipes extending along the coil arrangement direction; and first and second fixing members for fixing the stationary element, said first fixing member being arranged at substantially central portions of the coils to extend along the coil arrangement direction, and said second fixing members being arranged at two end portions, in the coil arrangement direction, of said stationary element, wherein the movable element has a substantially C-shaped section when viewed along a direction perpendicular to the coil arrangement direction.

* * * * *

UNITED STATES PATENT AND TRADEMARK OFFICE
CERTIFICATE OF CORRECTION

PATENT NO. : 5,703,420

DATED : December 30, 1997

INVENTOR(S): SHIGETO KAMATA ET AL.

It is certified that error appears in the above-identified patent and that said Letters Patent is hereby corrected as shown below:

COLUMN 4

Line 23, "substantially-the" should read --substantially the--.

COLUMN 7

Line 21, "relative" should be deleted.

Line 22, "move" should be --move relative--.

Line 65, "aspect" should read --aspects--.

UNITED STATES PATENT AND TRADEMARK OFFICE
CERTIFICATE OF CORRECTION

PATENT NO. : 5,703,420

DATED : December 30, 1997

INVENTOR(S) : SHIGETO KAMATA ET AL.

It is certified that error appears in the above-identified patent and that said Letters Patent is hereby corrected as shown below:

COLUMN 9

Line 31, "a vibration" should read --vibration--.

Signed and Sealed this

Fifteenth Day of December, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,703,420

DATED : December 30, 1997

INVENTOR(S) : SHIGETO KAMATA ET AL.

It is certified that error appears in the above-identified patent and that said Letters Patent is hereby corrected as shown below:

Item
[56] REFERENCES CITED

```
U.S. Patent Documents
   "5,255,725 10/1993  Shiraki et al." should read
   --5,225,725  7/1993 Shiraki et al.--.
```

Signed and Sealed this

Twenty-third Day of March, 1999

Attest:

Q. TODD DICKINSON

*Attesting Officer*     *Acting Commissioner of Patents and Trademarks*